United States Patent [19]
Stephens et al.

[11] 3,861,482
[45] Jan. 21, 1975

[54] TRAILER DRIVE ARRANGEMENT

[76] Inventors: W. J. Stephens, 3125 S. W. 15th St.;
Frank J. Oleski, 3451 S. W. 17th
St., both of Fort Lauderdale, Fla.

[22] Filed: June 7, 1973

[21] Appl. No.: 367,838

[52] U.S. Cl. ............... 180/13, 180/14 R, 180/19 R
[51] Int. Cl. ............................................. B60s 9/16
[58] Field of Search ........ 180/13, 14 R, 19 S, 19 H, 180/19 R, 52, 65 R, 65 F, 26 R; 280/43.19, 43.21, 43.23

[56] References Cited
UNITED STATES PATENTS

| | | | |
|---|---|---|---|
| 2,468,801 | 5/1949 | Beall | 180/26 R |
| 3,370,666 | 2/1968 | Holtzclaw | 180/14 R |
| 3,387,681 | 6/1968 | Rabjohn | 180/13 |
| 3,433,318 | 3/1969 | Packard | 180/52 X |
| 3,439,764 | 3/1969 | Kimball | 180/65 R |
| 3,690,397 | 9/1972 | Parker | 180/19 R X |
| 3,770,070 | 11/1973 | Smith | 180/13 |
| 3,779,328 | 12/1973 | Wollenburg | 180/19 R X |
| 7,783,960 | 1/1974 | Feliz | 180/13 X |

*Primary Examiner*—David Schonberg
*Assistant Examiner*—Terrance L. Siemens
*Attorney, Agent, or Firm*—Oltman and Flynn

[57] ABSTRACT

A motor-driven wheel is coupled through a rigid support to the front end of a trailer for moving the latter around when the wheel is in driving engagement with the ground. The ground wheel may be raised to an inoperative position off the ground, when desired. One or more springs act between the support and the ground wheel. The ground wheel may be turned to various angular positions with respect to the trailer.

5 Claims, 9 Drawing Figures

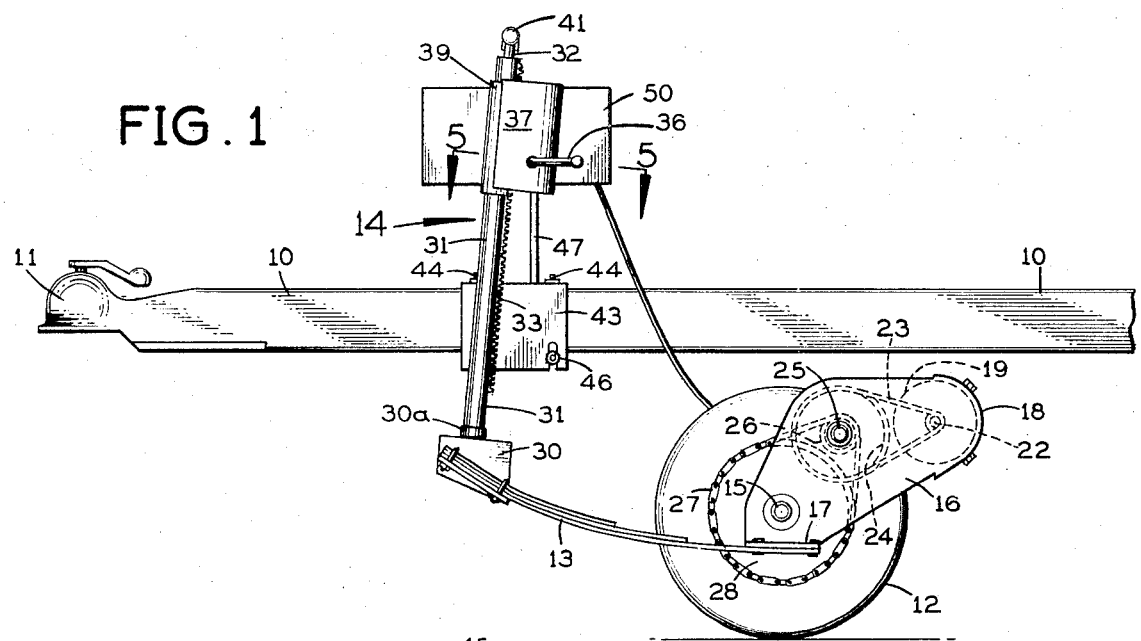
FIG. 1
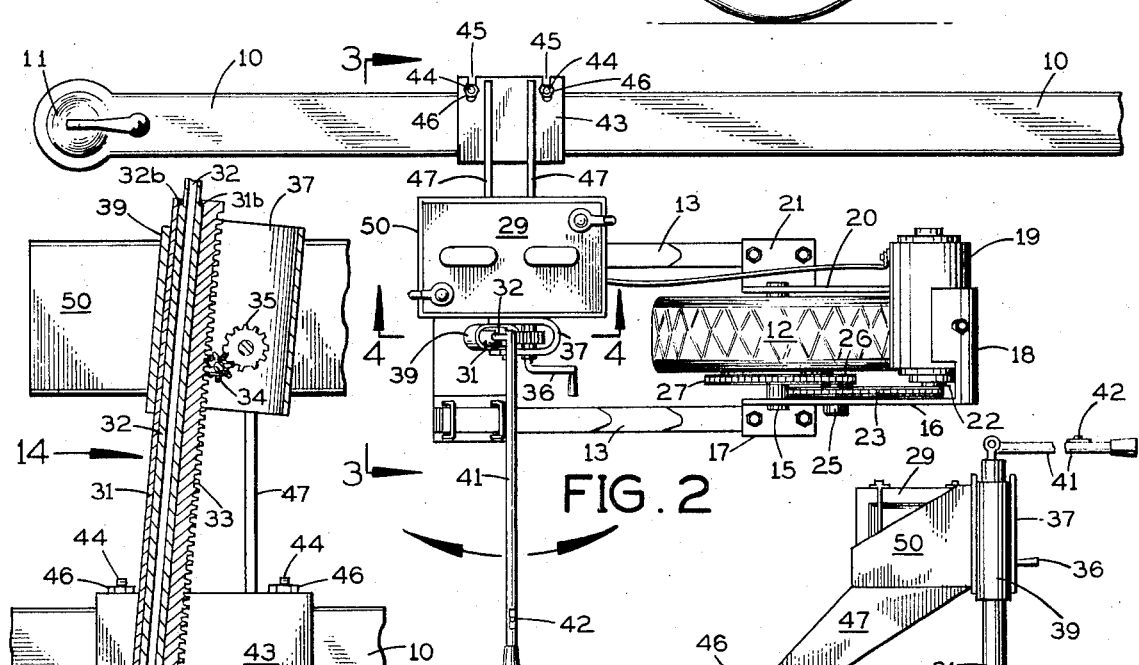
FIG. 2
FIG. 3
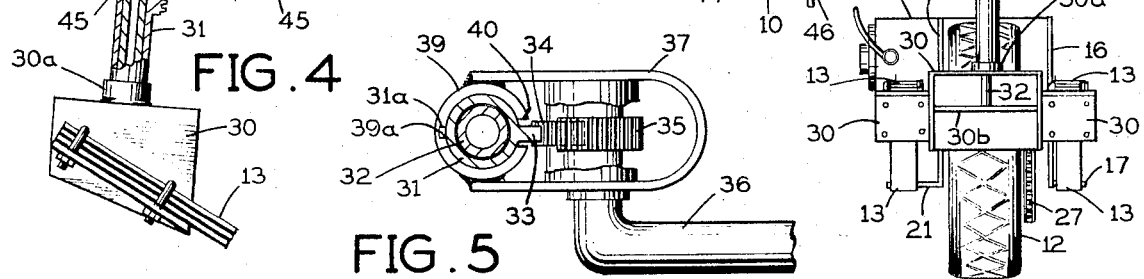
FIG. 4
FIG. 5

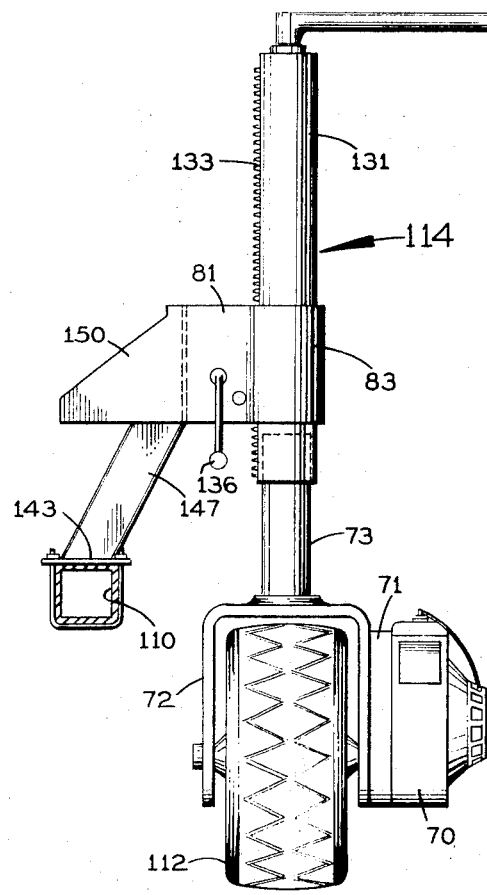
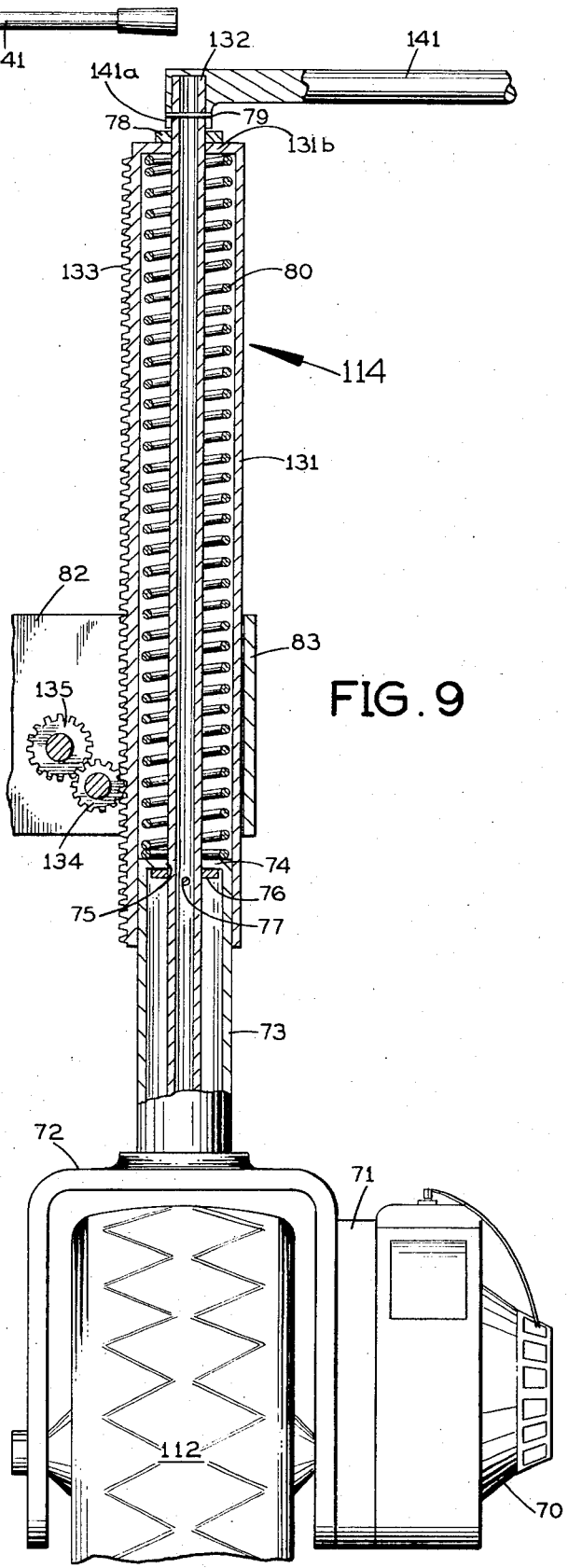
FIG. 8
FIG. 9

TRAILER DRIVE ARRANGEMENT

BACKGROUND OF THE INVENTION

Various arrangements have been proposed heretofore for enabling a trailer which is normally coupled to a towing vehicle, such as a passenger automobile or truck, to be moved around when uncoupled from the towing vehicle. Such prior arrangements have included motor-operated drive arrangements and hand-powered drive arrangements. However, none of these prior arrangements would be entirely satisfactory and efficient for moving a boat trailer around after or before its attachment to a towing vehicle, particularly at the usual inclined launching ramp at the edge of the shore of the lake or river where the boat on the trailer is to be used.

SUMMARY OF THE INVENTION

The present invention is directed to a novel and improved power-operated drive arrangement that is particularly well-suited for moving a boat trailer around when it is uncoupled from the usual towing vehicle.

Accordingly, it is a principal object of this invention to provide a novel and improved power-operated drive arrangement for a detachable trailer, particularly a boat trailer.

Another object of this invention is to provide such a drive arrangement having a ground wheel that may be raised to an inoperative position or lowered to an operative position in which it has sufficient traction on the ground to move the trailer under the easy control of the user.

Another object of this invention is to provide a novel power-operated drive arrangement for a detachable trailer in which the ground wheel can move up and down with respect to the trailer frame with sufficient freedom to enable the trailer frame to accommodate the usual significant change of its position as it passes over the top of a boat-launching ramp without raising the rear wheels of the towing car or truck up off the ground.

Another object of this invention is to provide a novel power-operated drive arrangement for a detachable trailer that is positioned to one side of the trailer frame for easier access and handling.

Another object of this invention is to provide a novel drive arrangement for a detachable trailer in which a power-operated ground wheel is adjustable angularly of the trailer frame to introduce a lateral component into the movement of the trailer frame by the ground wheel.

Further objects and advantages of this invention will be apparent from the following detailed description of two presently preferred embodiments thereof, which are illustrated in the accompanying drawings, in which:

FIG. 1 is a side elevational view showing a first embodiment of the present drive arrangement coupled to the front end of a boat trailer of conventional design;

FIG. 2 is a top plan view of the FIG. 1 assembly;

FIG. 3 is a vertical cross-section taken along the line 3 — 3 in FIG. 2;

FIG. 4 is a fragmentary longitudinal vertical section taken along the line 4 — 4 in FIG. 2;

FIG. 5 is a fragmentary horizontal section taken along the line 5 — 5 in FIG. 1;

FIG. 8 is a front elevational view of the drive arrangement; and

FIG. 9 is an elongated vertical section taken along the line 9 — 9 in FIG. 6 and showing details of the post assembly.

Figure 6:
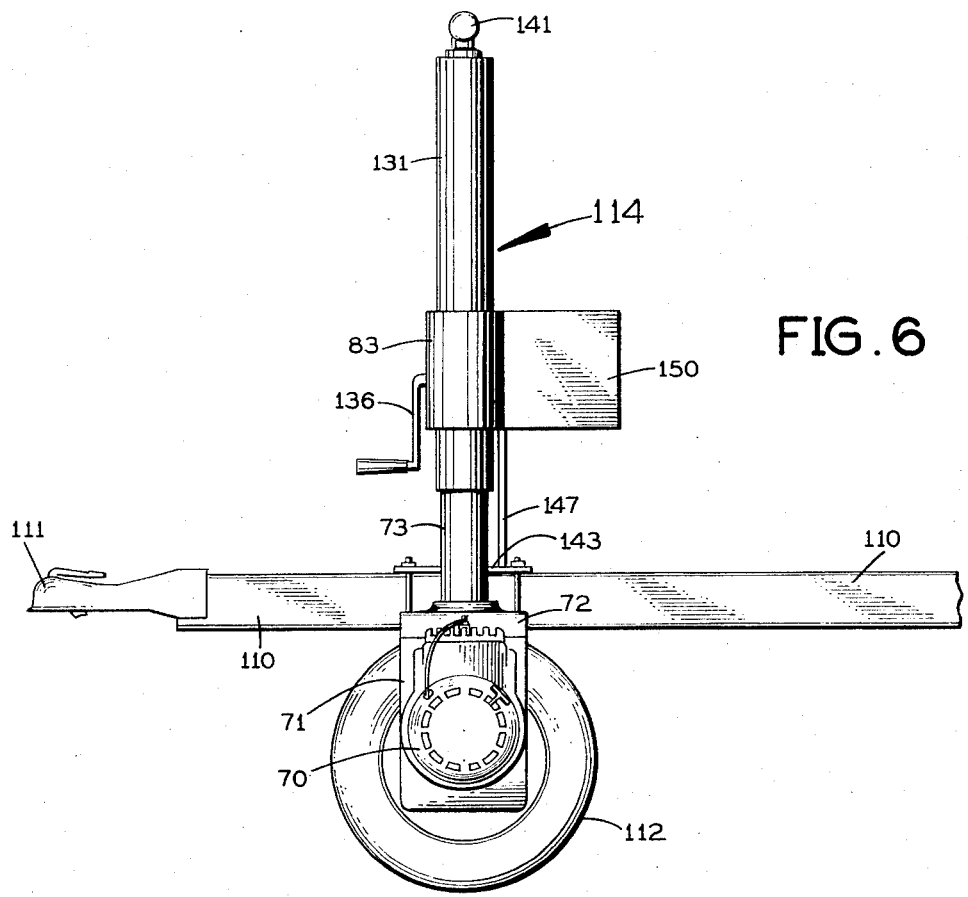
FIG. 6 is a side elevational view of a second embodiment of the present drive arrangement coupled to a boat trailer.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

Referring first to FIGS. 1 – 5, the frame of a boat trailer is shown as having a forwardly projecting tongue 10 that normally extends substantially horizontal. This tongue is a rigid, hollow beam of rectangular cross-section, as best seen in FIG. 3. At its front end the tongue carries a ball joint socket member 11 for releasable attachment to the usual connection ball on the trailer hitch at the back end of an automobile or truck used to haul the boat trailer to or from a launching ramp at the edge of the body of water where the boat is to be used.

A single ground-engaging wheel 12 is coupled to the tongue of the boat trailer frame through a pair of leaf spring units 13 and a post assembly 14 such that:

a. the ground wheel 12 can move up and down with respect to the boat trailer frame, particularly when going over the top of a launching ramp;

b. the ground wheel 12 can be raised up off the ground to an inoperative position when the trailer is attached to a towing vehicle or lowered into engagement with the ground with the desired amount of traction when the wheel is to be driven by its motor to move the trailer around; and c. the ground wheel 12 can be turned angularly with respect to the longitudinal centerline of the boat trailer for steering the latter laterally.

The ground wheel 12 is on a horizontal axle 15 and it is disposed entirely to one side of the boat trailer tongue 10, as best seen in FIG. 2. This tongue extends along the longitudinal centerline of the trailer.

The outer end of the wheel axle 15 (away from the trailer tongue 10) is carried by a rigid support body having a vertical wall 16 at the outboard side of the wheel, a horizontal, outturned bottom flange 17 at its front end that is rigidly attached to the back end of the leaf spring unit 13 at that side of the wheel, and an inwardly-projecting, arcuate segment 18 at its upper end. An electric motor 19 for driving the ground wheel 12 is bolted to the inside of this arcuate segment 18.

The inner end of the wheel axle 15 (toward the trailer tongue 10) is carried by a rigid support body having a vertical wall 20 (FIG. 2) at the inboard side of the wheel, and a horizontal, out-turned bottom flange 21 at its front end that is rigidly attached to the back end of the leaf spring unit 13 at that side of the wheel.

The output shaft 22 of motor 19 drives the ground wheel 12 through a speed-reduction unit that includes a first endless chain 23 driven by the motor shaft and, in turn, driving a large gear 24 on an idler shaft 25. A small gear 26 on the back end of this idler shaft drives a second endless chain 27 that, in turn, drives a large gear 28 on the wheel axle.

In the particular embodiment illustrated, the ground wheel motor 19 is a D.C. motor that is energized by a battery 29 that is supported by the trailer tongue 10 as explained hereinafter. The electrical wiring that connects the battery 29 to the motor 19 includes a manual switch, as described hereinafter, that may be closed and opened to turn the motor on and off.

The battery 29 is seated in an open-topped battery box 50 that is rigidly attached to the trailer tongue 10 so as to be located upward and to the right of the trailer tongue, viewed from the front (FIG. 3). The battery box 50 is attached to the trailer tongue by a support assembly that includes a right-angled plate 43 that abuts against the top and the right side of the trailer tongue in FIG. 3, and right-angled bolts 44 that extend across the bottom and the left side of the trailer tongue and through slots 45 (FIG. 2) in the plate 43. Nuts 46 are threaded onto the opposite ends of these bolts and are clamped against the plate 43 (FIG. 3). A pair of rigid arms 47 extend between the top of the plate 43 and the bottom of the battery box 50, and are rigidly attached to both of them such as by welding.

Alternatively, the ground wheel motor may be powered from a battery on the boat or from a battery on the car or truck that hauls the boat trailer.

The front ends of the leaf spring units 13 on opposite sides of the ground wheel 12 are suitably clamped to a generally horizontally extending rigid support body 30 that extends transverse to the trailer tongue 10 and is disposed completely to one side of the trailer tongue, as shown in FIG. 2.

The post assembly 14 includes an outer sleeve 31 and an inner post 32 that is concentrically received in the outer sleeve. The lower end of the outer sleeve 31 is rotatably received in a cylindrical collar 30a on the top of the transverse support body 30. The inner post 32 has its lower end rigidly attached to a cross-piece 30b (FIG. 3) on the transverse support body 30 below the latter's upstanding collar 30a.

The outer sleeve 31 carries an upwardly extending, rearwardly facing rack 33 that meshes with a pinion 34 (FIG. 4) driven by a larger gear 35 attached to a manually operated crank 36. The crank is rotatably supported by a bifurcated housing 37 that is fixedly attached to the outer side of the battery box 50 (away from the trailer tongue 10), as best seen in FIG. 2. The opposite legs of the bifurcated housing 37 are welded to the opposite sides of a split sleeve 39, which is generally C-shaped in cross-section, as shown in FIG. 5. This split sleeve 39 slidably receives the outer sleeve 31 of the post assembly, and the rack teeth 33 on sleeve 31 project rearwardly through the longitudinal slot or opening 40 at the back of the split sleeve 39. A tongue 31a (FIG. 5) on the front of sleeve 31 fits slidably in a longitudinal groove 39a on the inside of the split sleeve 39 to guide the split sleeve 39 along sleeve 31.

At its upper end, the outer sleeve 31 in the post assembly has an inturned annular lip 31b (FIG. 4) that overlies an upwardly facing shoulder 32b on the inner post 32. The inner post 32 projects up beyond the outer sleeve 31, and a horizontal handle 41 extends laterally outward from its upper end. This handle carries a switch 42 that controls the energization of the wheel drive motor 19 from the battery 29.

The bifurcated housing 37 and the split sleeve 39 are part of a rigid support that also includes the battery box 50, arms 47 and plate 43, which is rigidly attached to the trailer tongue 10. When the crank 36 is turned, the drive through gear 35 and pinion 34 acts on the rack 33 to effect relative upward or downward movement between the split sleeve 39, which is attached to the trailer, and the sleeve 31, which is coupled to the ground wheel 12, depending upon the direction in which the crank is turned.

Whenever the user wants to raise the ground wheel 12 to a position where it will not engage the ground (e.g., while the boat trailer is being pulled by the towing vehicle and the ground wheel motor 19 is de-energized), the crank 36 may be turned in a direction to raise the sleeve 31 and post 32 with respect to the trailer-attached housing 37 and split sleeve 39.

Conversely, when the user wants to use the motor-driven ground wheel 12 to move the boat trailer (after the trailer is disconnected from the towing vehicle), he may turn the crank 36 in the opposite direction so as to lower the sleeve 31 and post 32 with respect to the trailer-attached housing 37 and split sleeve 39.

The spring units 13 permit the trailer tongue 10 to move up and down relative to the ground wheel 12, and vice versa. This is particularly advantageous when the trailer is being towed by an automobile over the top of a launching ramp, where there is a relatively abrupt change from the upward inclination of the ramp itself to the substantially horizontal disposition of the adjoining ground. Under such circumstances, if the trailer frame were rigidly supported above the ground it would tend to lift the back wheels of the towing vehicle off the ground and thereby interrupt the towing because of a loss of traction. With the present spring coupling between the trailer frame and the ground wheel 12, the trailer tongue can follow the movement of the towing vehicle vertically with respect to the inclined surface of the ramp while the ground wheel 12 continues to engage the ramp.

Instead of extending parallel to the trailer tongue 10, as shown in FIG. 2, the ground wheel 12 may be positioned at an acute angle to the trailer tongue 10 in either direction by turning the handle 41 and the inner post 32 about the axis of the post assembly 14. Since the lower end of the inner post 32 is connected rigidly to the transverse support body 30 this support body is turned in unison with the handle 41. The spring units 13 and ground wheel 12 turn in unison with the support body 30 about the axis of the post assembly 14 to position the wheel at the desired angle to the trailer tongue 10 for steering the trailer laterally.

Figure 7:
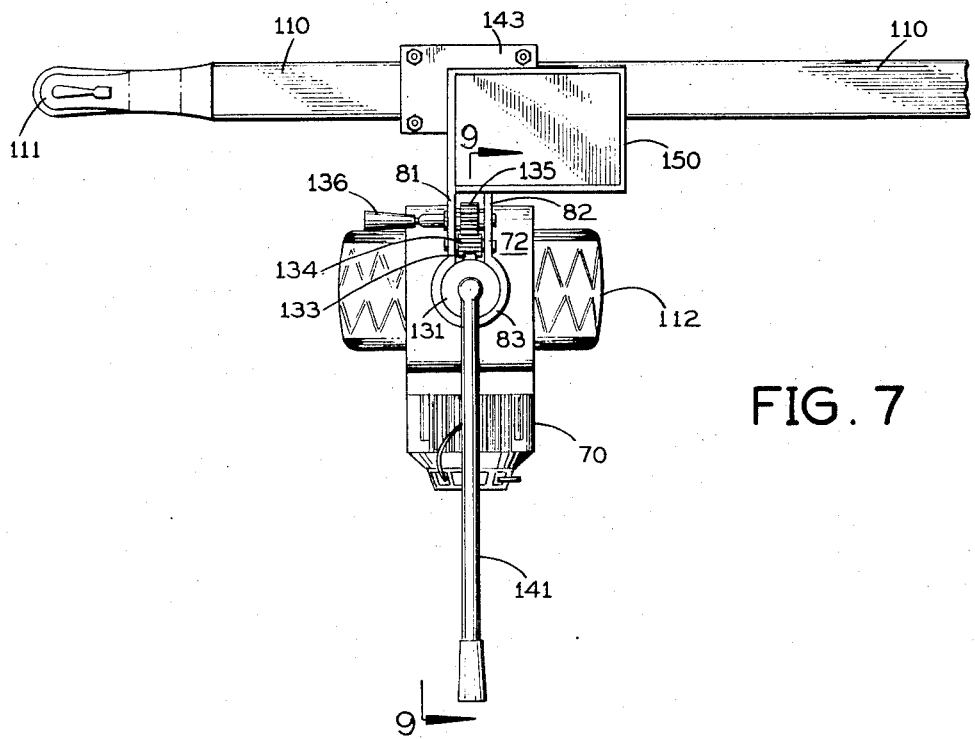
FIG. 7 is a top plan view of the FIG. 6 drive arrangement.

FIGS. 6 – 9 show a second presently-preferred embodiment of the invention which differs from the first, principally in that the spring arrangement acting between the trailer frame and the ground wheel is incorporated in the post assembly. Elements of this second embodiment which correspond to those in FIGS. 1 – 5 are given the same reference numerals, plus 100, and the detailed description of these elements is omitted as unnecessarily repetitious.

In this second embodiment the drive motor for the ground wheel 112 is a small gasoline engine 70 having its output shaft connected through a gear reduction 71 to the ground wheel 112. The engine and gear reduction are mounted on the outer side of a yoke 72 that rotatably supports the ground wheel axle.

The inner post 132 has its lower end rigidly attached to the top of the wheel yoke 72. A cylindrical coupling member 73, which is part of the post assembly 114, has its lower end rotatably engaging the top of the wheel yoke 72. As shown in FIG. 9, the upper end of coupling member 73 has an in-turned horizontal top wall 74 with a central opening 75 that slidably receives the inner post 132. This post carries a flat annular washer 76 supported by a cross pin 77 and engaging beneath the top wall 74 of coupling member 73, so that upward movement of the post 132 will be imparted to the coupling member 73.

The post 132 extends up through the hollow interior of a sleeve 131 that has a longitudinal rack 133 at the front. A manually operated crank 136 drives the rack 133 through a gear 135 and a pinion 134.

Sleeve 131 has a horizontal, in-turned top wall 131b with a central opening that slidably receives the upper end of the post 132. A flat annular washer 78 is engaged between the upper face of this top wall 131b and a downwardly facing collar 141a on the handle 141 that is fastened to the post 132 by a cross pin 79. With this arrangement, upward movement of the sleeve 131 will be imparted to the post 132.

A coil spring 80 inside the sleeve 131 is engaged under compression between the latter's top wall 131b and the top wall 74 of coupling member 73.

A battery box 150 is supported by rigid arms 147 (FIG. 8) extending upward and laterally outward from plate 143.

The sleeve 131 in the post assembly 114 is rigidly supported at the laterally outward side of a battery box 150 (away from the trailer tongue 110) by a bracket having opposite arms 81, 82 (FIG. 7) extending out from the battery box and a cylindrical outer end segment 83, which extends around the sleeve 131. The battery box 150 receives and supports a battery if the gasoline engine 70 is replaced by an electric motor for driving the ground wheel 112.

The bracket 81-83, battery box 150, arms 147 and plate 143 constitute a rigid support which is rigidly attached to the trailer tongue 110.

In the operation of this second embodiment, when the crank 136 is turned in a direction to move the sleeve 131 upward with respect to the trailer frame, the post 132 also moves up due to the coupling between these elements at 131b, 78 and 79. Such upward movement of the post 132 is imparted through the coupling at 77, 76, 74 to the lower coupling member 73. Also, the upward movement of the post 132 is imparted directly to the wheel yoke 72 to raise the ground wheel 112 off the ground.

When the crank 136 is turned in a direction to lower the sleeve 131 with respect to the trailer frame, the sleeve 131 imparts a downward force through the spring 80 on the lower coupling member 73 to urge the latter downward. This downward force on the coupling member 73 is imparted to the post 132 through the coupling between them at 74, 76, 77.

After the ground wheel is brought into engagement with the ground, continued downward displacement of the sleeve 131 (through the crank 136) causes the spring 80 to be compressed progressively.

The handle 141 may be turned about the axis of the post assembly 114 to position the ground wheel 112 at any desired angle with respect to the longitudinal centerline of the trailer. Such turning of handle 141 is imparted directly through the inner post 132 to the wheel yoke 72.

In both embodiments of the invention, the adjustable post assembly 14 and 114 and the ground wheel 12 or 112 and its drive motor are both located completely to one side of the trailer tongue 10 or 110, for convenient access by the user desiring to adjust the ground wheel vertically or angularly.

It is to be understood that the present drive arrangement may be used on small camper trailers, house trailers, and "U-haul-it" trailers, as well as on boat trailers.

We claim:

1. In a drive arrangement for a trailer that is releasably attachable to a towing vehicle, said drive arrangement having:

a ground wheel;
a motor for driving said ground wheel;
rigid support means for the ground wheel having provision for rigid attachment to the trailer;
a manually operable crank and gear means driven by said crank, said crank and gear means being rotatably carried by said support means;
and an upwardly extending rack meshing with said gear means to be displaced thereby upward or downward with respect to said support means;

the improvement which comprises:

an upwardly extending hollow sleeve having said rack attached thereto;
a coupling member slidably received in the lower end of said sleeve and extending downward from the latter, a wheel support extending down from the lower end of said coupling member and rotatably supporting the ground wheel;
means coupling said sleeve to said coupling member and to said wheel support to impart the upward movement of the sleeve to the coupling member and to the wheel support;
and a coil spring received inside said sleeve above said coupling member and compressed axially between them to yieldingly oppose relative vertical movement between said rack and said ground wheel.

2. A drive arrangement according to claim 1, wherein said means coupling said sleeve to said coupling member and to said wheel support comprises:

a post extending down through said sleeve and down through said coupling member and having its lower end attached to said wheel support,
means acting between said post and said sleeve to impart upward movement of the sleeve to the post;
and means acting between said post and said coupling member to impart upward movement of the post to said coupling member.

3. A drive arrangement according to claim 2, wherein said wheel support rotatably engages the lower end of said coupling member, and said post is rotatable to turn the wheel support and the ground wheel angularly with respect to the trailer.

4. In a drive arrangement for a trailer having a forwardly projecting tongue with trailer hitch attachment means at its front end for detachable connection to a trailer hitch on a towing vehicle, said drive arrangement including:

a ground wheel;
a motor for driving said ground wheel;
a rigid support having means for rigid attachment to the trailer tongue behind the latter's hitch attachment means;

an upwardly extending rack carried by said support upward from and laterally to one side of said attachment means on said support;

and a manually operable crank and gear means driven by said crank rotatably carried by said support, said gear means meshing with said rack for moving the rack up and down with respect to said support;

the improvement which comprises:

an upwardly extending hollow sleeve having said rack attached thereto;

a coupling member slidably received in the lower end of said sleeve and extending downward from the latter, a wheel support extending down from the lower end of said coupling member and rotatably supporting the ground wheel;

means coupling said sleeve to said coupling member and to said wheel support to impart the upward movement of the sleeve to the coupling member and to the wheel support;

and a coil spring received inside said sleeve above said coupling member and compressed axially between them to yieldingly oppose upward movement of said ground wheel.

5. A drive arrangement according to claim 4, wherein said wheel support rotatably engages the lower end of said coupling member, and said means coupling said sleeve to said coupling member and to said wheel support comprises:

a post extending rotatably down through said sleeve and down through said coupling member and attached at its lower end to said wheel support, said post being rotatable to turn the wheel support and the ground wheel angularly with respect to the trailer;

means acting between said post and said sleeve to impart upward movement of the sleeve to the post;

and means acting between said post and said coupling member to impart upward movement of the post to said coupling member.

* * * * *